(12) United States Patent
Picard

(10) Patent No.: US 8,837,640 B2
(45) Date of Patent: Sep. 16, 2014

(54) MULTIPLE PROTOCOL RECEIVER

(75) Inventor: Gilles Picard, Thiais (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/366,094

(22) Filed: Feb. 3, 2012

(65) Prior Publication Data
US 2013/0100987 A1  Apr. 25, 2013

Related U.S. Application Data

(63) Continuation of application No. PCT/US2012/023017, filed on Jan. 27, 2012.

(30) Foreign Application Priority Data

Oct. 21, 2011  (EP) .................................... 11186210

(51) Int. Cl.
*H03D 1/00* (2006.01)
*H04L 27/00* (2006.01)
*H04L 7/04* (2006.01)

(52) U.S. Cl.
CPC ............. *H04L 27/0008* (2013.01); *H04L 7/041* (2013.01); *H04L 27/0012* (2013.01)
USPC ........... 375/340; 375/347; 375/130; 375/141; 455/436

(58) Field of Classification Search
USPC .................... 375/130, 347, 340, 141; 370/342
See application file for complete search history.

(56) References Cited

U.S. PATENT DOCUMENTS

| | | | |
|---|---|---|---|
| 6,411,219 B1 | 6/2002 | Slater | |
| 6,914,950 B1 * | 7/2005 | Luneau | ........................ 375/347 |
| 6,987,444 B2 | 1/2006 | Bub et al. | |
| 7,065,125 B1 * | 6/2006 | Miller et al. | .................. 375/130 |
| 7,460,621 B2 | 12/2008 | Lewis | |
| 7,583,197 B2 | 9/2009 | Wesby Van Swaay | |
| 7,729,329 B2 * | 6/2010 | Fujita et al. | ................... 370/342 |
| 7,813,374 B2 | 10/2010 | Moorti et al. | |

(Continued)

FOREIGN PATENT DOCUMENTS

| | | |
|---|---|---|
| WO | WO0106759 | 1/2001 |
| WO | WO0148490 | 7/2001 |

OTHER PUBLICATIONS

Yeh et al; Softeare-Defined Radio for OFDM Transceivers; IEEE 2010; 978-4244-5883-7/10.*

(Continued)

*Primary Examiner* — Eva Puente
(74) *Attorney, Agent, or Firm* — Lee & Hayes, PLLC

(57) ABSTRACT

Implementation and operation of a multiple protocol receiver are described herein. In one example, a multiple protocol receiver in a node may alternate between first and second states. In a first state, the multiple protocol receiver listens simultaneously for a plurality of differently modulated signals. Such listening may be performed in a parallel manner, wherein a plurality of preamble detection processes each listens for a specific preamble. The listening may result in detection of a preamble of a packet, which triggers transition to the second state. The detected preamble may indicate a protocol used in transmission of the packet. The received packet may then be demodulated according to, for example, a data rate, synchronization, redundancy and/or other factors indicated by the protocol. The received packet may be utilized by the node or retransmitted. The multiple protocol receiver may return to the first state to repeat and continue the procedure.

21 Claims, 5 Drawing Sheets

(56) References Cited

U.S. PATENT DOCUMENTS

| | | | |
|---|---|---|---|
| 7,924,764 B2 | 4/2011 | Moorti et al. | |
| 7,929,916 B2 | 4/2011 | Picard | |
| 7,953,190 B2 | 5/2011 | Patel et al. | |
| 7,956,767 B2 | 6/2011 | Ratiu et al. | |
| 8,094,010 B2 | 1/2012 | Wesby-Van Swaay | |
| 2001/0017881 A1* | 8/2001 | Bhatoolaul et al. | 375/130 |
| 2004/0110510 A1 | 6/2004 | Jeon et al. | |
| 2004/0192219 A1 | 9/2004 | Malone et al. | |
| 2004/0240486 A1 | 12/2004 | Venkatesh et al. | |
| 2006/0223468 A1 | 10/2006 | Toms et al. | |
| 2006/0223572 A1 | 10/2006 | Hedin et al. | |
| 2007/0058623 A1 | 3/2007 | Moorti et al. | |
| 2007/0155423 A1 | 7/2007 | Carmody et al. | |
| 2008/0002681 A1 | 1/2008 | Bajic et al. | |
| 2008/0074285 A1 | 3/2008 | Guthrie | |
| 2008/0089390 A1 | 4/2008 | Picard | |
| 2008/0117077 A1 | 5/2008 | Ratiu et al. | |
| 2008/0118011 A1 | 5/2008 | Trachewsky et al. | |
| 2008/0233890 A1 | 9/2008 | Baker | |
| 2008/0272934 A1 | 11/2008 | Wang et al. | |
| 2009/0243869 A1 | 10/2009 | Sanderford, Jr. | |
| 2009/0310699 A1 | 12/2009 | Kodama et al. | |
| 2010/0130245 A1* | 5/2010 | Iseda | 455/522 |
| 2010/0278187 A1 | 11/2010 | Hart et al. | |
| 2011/0044395 A1 | 2/2011 | Hansen et al. | |
| 2011/0075614 A1* | 3/2011 | Newkirk et al. | 370/329 |
| 2011/0110229 A1 | 5/2011 | Himayat et al. | |
| 2011/0182326 A1 | 7/2011 | Picard | |
| 2012/0250729 A1* | 10/2012 | Miller et al. | 375/141 |

OTHER PUBLICATIONS

Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.
The PCT Search Report mailed Oct. 31, 2012 for PCT application No. PCT/US12/23017, 9 pages.
The Canadian Office Action mailed Mar. 27, 2012 for Canadian patent application No. 2,756,703, 3 pages.
The Extended European Search Report mailed Apr. 19, 2012 for European patent application No. 11186210.8, 8 pages.
Williams, Richard "Improving Efficiency When Detecting WLAN Preambles" published 2013 UBM Electronics; retrieved from http://www.eetimes.com/document.asp?doc_id=1271968&print=yes on Jul. 29, 2013; 6 pages.
Office Action from the Canadian Intellectual Property Office, Application No. 2,756,704, mailed on Oct. 23, 2012, 3 pages.
Office Action from the Canadian Intellectual Property Office, Application No. 2,756,704, mailed on Mar. 29, 2012, 3 pages.
Office Action from the Canadian Intellectual Property Office, Application No. 2,756,703, mailed on Jul. 26, 2012, 3 pages.
Office action for U.S. Appl. No. 13/278,421, mailed on Oct. 16, 2013, Picard, "Multiple Protocol Receiver", 13 pages.
PCT Search Report for Application No. PCT/US2011/062798, mailed Feb. 22, 2012, 2 pages.
PCT Search Report for Application No. PCT/US11/62814, mailed Mar. 2, 2012, 2 pages.
PCT Written Opinion for Application No. PCT/US2011/062798, mailed on Feb. 22, 2012, 7 pages.
PCT Written Opinion for Application No. PCT/US11/62814, mailed Mar. 2, 2012, 4 pages.

* cited by examiner

MULTIPLE PROTOCOL RECEIVER

RELATED APPLICATIONS

This application is a continuation of, and claims priority to, PCT International Application No. PCT/US12/23017, filed Jan. 27, 2012, which claims foreign priority to European Application No. 11186210.8, filed on Oct. 21, 2011, both of which are incorporated herein by reference.

BACKGROUND

Wireless networks are configured for many purposes. They may be configured in small areas, such as a residence, or larger areas such as an enterprise-wide network. In some cases, wireless networks extend over entire cities, states, continents and the globe. Generally, wireless networks include a plurality of nodes, each node capable of at least one-way communication.

Node diversity is common among networks. For example, nodes may have different purposes, locations and abilities. Some of this diversity is due to the age of a node, power limitations of a node, antenna limitations, etc. Diversity may be further increased by an expanded or changed scope of the mission of some nodes and/or portions of the network.

Both hardware and software differences may exist between nodes, and across the network. Hardware differences may include component age, technology, power supply, antenna design, etc. Software differences may include limitations due to memory, processor speed, protocol availability, software version, etc.

Thus, considerable diversity may exist in a network.

SUMMARY

Implementation and operation of a multiple protocol receiver are described herein. In one example, a multiple protocol receiver may alternate between first and second states. In a first state, the multiple protocol receiver listens for a plurality of differently modulated signals. Such listening may be performed in a parallel manner, wherein a plurality of preamble detection processes operates in a multitasking environment, each listening for a different preamble. The listening may result in detection of a preamble of a packet by one of the preamble detection processes. Such detection may trigger transition to the second state. The detected preamble may indicate a protocol used in transmission of the packet. A packet demodulator may be selected based on the protocol used. The received packet may then be demodulated according to a data rate, synchronization, error correction and/or other factors indicated by the protocol. The received packet may be utilized by the receiving node or retransmitted. The multiple protocol receiver may return to the first state to repeat and continue the procedure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
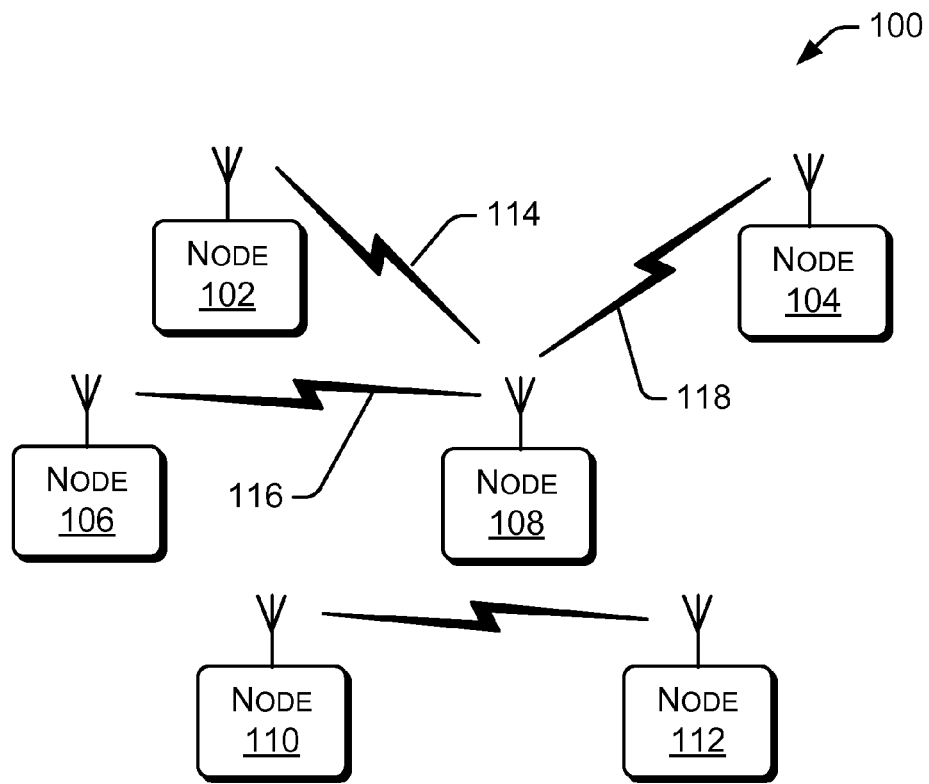
FIG. 1 is a diagram showing a high-level view of a network having nodes configured with multiple protocol receivers.

The disclosure describes techniques associated with a multiple protocol receiver. In one example, a multiple protocol receiver may simultaneously listen for a plurality of differently modulated signals. The signals may be radio frequency (RF) signals sent by a node in an RF network. In a utility industry setting, the nodes may include endpoints, meters, cellular relays, routers, transformers, substations, servers and head offices, for example. While techniques are described herein in the context of a utility network, the techniques are also applicable to other types of networks as well, such as, for example, telecommunications networks, sensor networks, and the like. In the context of other networks, nodes may include servers, computers, routers, switches, sensors, or any other device coupled to any type of network.

A plurality of preamble recognition processes may operate in a parallel processing mode and listen for a plurality of modulated signals. One of the preamble recognition processes may detect a preamble of a packet. The preamble may indicate or identify a protocol of the packet. A packet demodulator associated with the protocol may be selected to demodulate the packet. Operating in a serial processing mode, the selected packet demodulator may demodulate data received in the packet according to the protocol. The sequence of detection of preamble, identification of a protocol and demodulation of data may be repeated for a plurality of packets. Thus, the multiple protocol receiver may sequentially receive a plurality of packets associated with a plurality of different protocols and modulations. Accordingly, a sequence of packets received and demodulated by the multiple protocol receiver does not have to be associated with a single protocol.

In a further example, a multiple protocol receiver may alternate between first and second states. In a first state, the multiple protocol receiver listens for a plurality of differently modulated signals. Such listening may be performed in a parallel manner, wherein a plurality of preamble detection modules or processes operates in a multitasking environment, each listening for a different preamble. The listening may result in detection of a preamble of a packet, which triggers transition to the second state. The detected preamble may indicate a protocol used in transmission of the packet. The received packet may then be demodulated according to a data rate, synchronization, redundancy and other factors indicated by the protocol. The received packet may be utilized by a device associated with the multiple protocol receiver or retransmitted to a further device having a receiver. The multiple protocol receiver may return to the first state to repeat and continue the procedure. Thus, the multiple protocol receiver is able to receive packets from diverse nodes within the network, including nodes having diverse hardware, software and transmission protocols.

The discussion herein includes several sections. Each section is intended to be non-limiting. More particularly, this entire description is intended to illustrate components which may be utilized in a multiple protocol receiver, but not components which are necessarily required. The discussion begins with a section entitled "Example Network," which describes one environment that may implement the techniques described herein. Next, a section entitled "Example Packet Structure" illustrates and describes example data techniques that can be used within the network environment. Next, a section entitled "Example Multiple Protocol Receiver" illustrates and describes techniques that can be used in the structure and design of a multiple protocol receiver in a network environment. Next, a section entitled "Example Processes" illustrates and describes techniques associated with operation of a multiple protocol receiver in a network environment. This section also addresses example implementation and operation of a state machine or similar logical construct usable in a multiple protocol receiver. Finally, the discussion ends with a brief conclusion.

This brief introduction, including section titles and corresponding summaries, is provided for the reader's convenience and is not intended to limit the scope of the claims or any section of this disclosure.

Example Network

FIG. 1 is a diagram showing a high-level view of a network 100 and is provided as an example environment wherein multiple protocol receivers may operate. The network 100 may be wireless in nature, and include radio frequency (RF) communication signals. The network 100 is intended to provide a specific implementation and to illustrate general concepts, but not to indicate required and/or necessary elements. In one example, the network 100 includes a plurality of nodes. The nodes may include utility meters, such as meters measuring consumption of electricity, natural gas and/or water. The nodes may additionally or alternately include cellular relays, transformers, endpoints, connections to the Internet, servers and other network elements.

The example network 100 includes a plurality of nodes 102-112, one or more of which may be configured with multiple protocol receivers. The nodes may include considerable diversity. For example, some nodes may be hard-to-reach. Such hard-to-reach nodes may be located in remote areas or may be located in areas that result in considerable signal attenuation, or both. In particular, a hard-to-reach node may require a bit rate that is lower than a bit rate used for other nodes and/or a signal power level that is higher than required for other nodes.

As another example of node diversity, nodes may be of different "generations." The different generations may define and/or implement different protocols, different technologies, different modulation types, different power levels, different antenna design and implementation, different signal strengths, etc.

Nodes may include those with conventional analog radios, software-defined radios and hybrid radio technologies that may include an RF front end combined with digital processing.

Accordingly, a plurality of different node constructions, technologies, ages, purposes and/or operations results in diversity within the network. In particular, a plurality of signal and/or transmission protocols may be present within the network 100. The plurality of protocols may result in considerable diversity in the RF links or modulated signals 114-118.

Example Packet Structure

Figure 2:
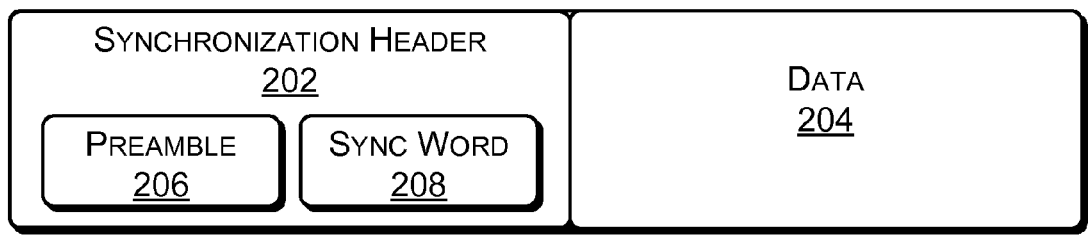
FIG. 2 is a diagram showing an example of packet structure usable with embodiments of the multiple protocol receiver.

FIG. 2 is a diagram showing an example structure of a packet 200 usable with embodiments of the multiple protocol receiver discussed herein. The packet structure 200 is representative of a format or organization of information within the RF links or modulated signals 114-118 of FIG. 1.

The packet 200 may include a synchronization header 202 and a data portion 204. In one example embodiment of the packet 200, the left-most elements, e.g., the synchronization header 202, are transmitted first in time within an RF signal (e.g., RF signals 114-118 of FIG. 1), and the right-most elements, e.g., the data 204, are transmitted second in time.

In transmission, the packet 200 may be modulated in a plurality of different manners, according to different protocols. The modulation may indicate aspects of the transmission, such as bit rate, synchronization, redundancy and/or other factors. The synchronization header 202 may be used to indicate a particular transmission protocol used by a transmitting node (during modulation) and a receiving node (during demodulation).

The synchronization header 202 may be configured with a preamble 206 and a sync word 208. The preamble 206 and the sync word 208 may be varied, based on a desired transmission/reception protocol that is used by the nodes involved (e.g., nodes 102-112 of FIG. 1). Thus, multiple protocols may be used to transmit packets generally represented by packet 200. Accordingly, a multiple protocol receiver may advantageously be configured to receive packets configured as any of a plurality of different protocols.

Example Multiple Protocol Receiver

Figure 3:
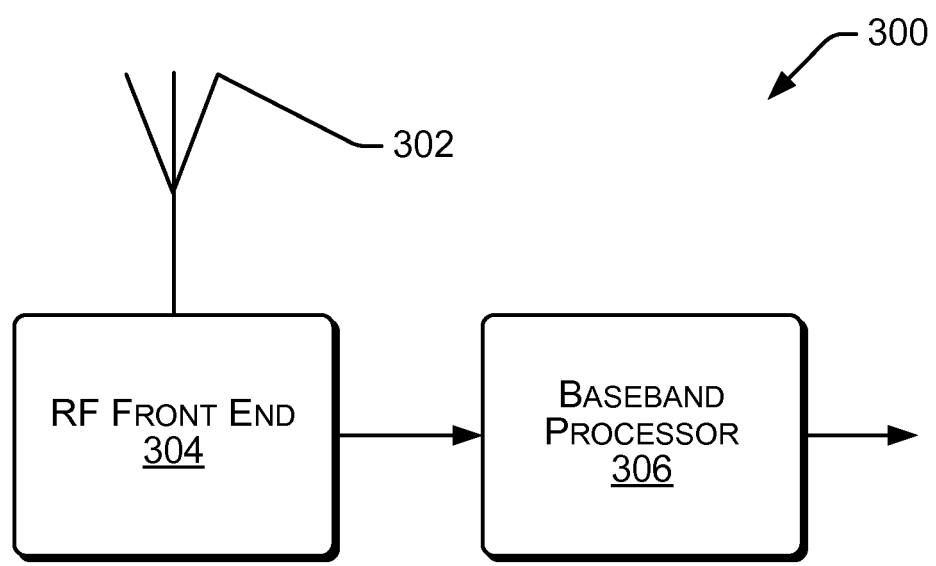
FIG. 3 is a diagram showing an example of a multiple protocol receiver.

FIG. 3 is a diagram showing an example of a multiple protocol receiver 300, configured to receive and tune RF signals, detect a preamble (e.g., from the synchronization header 202 of FIG. 2), determine a protocol based on the detected preamble, and demodulate data (e.g., from the data portion 204 of FIG. 2) based on the protocol. The multiple protocol receivers discussed herein may be configured in hardware, software and/or some combination of the two. For example, the multiple protocol receiver may be configured using a processor, memory and software instructions. Alternatively, the multiple protocol receiver 300 may be configured as an application specific integrated circuit (ASIC) or other hardware logic device having digital and/or analog components and/or functionality. Such functionality defined in the ASIC may include a processor, memory and processor-executable statements defined in the memory and executed by the processor. Moreover, the multiple protocol receiver may be associated with, integrated into, or in communication with, other components in a network node, end point, utility meter, cellular relay, transformer, substation, central office/server or other device.

An antenna 302 provides an RF signal (e.g., signals 114-118 of FIG. 1) to an RF front end 304. The RF front end 304 may be configured to receive one or more frequencies of RF signals. As output, the RF front end 304 may provide data that is generally in the form of an analog or digitized baseband signal sent to the baseband processor 306. A particular case, not to be construed as a typical and/or limiting case, may include a stream of one's and zero's representing data and/or packet(s).

The RF front end 304 may tune RF signals obtained from nodes within the network, and may be configured using high frequency hardware components. In an analog configuration, the RF front end 304 may be configured as a radio or transceiver using conventional or advanced technology allowing the tuning of one or more frequencies.

In one example of the RF front end 304, a single frequency, e.g., a same channel center frequency, is utilized for RF communications by one or more of the nodes (e.g., nodes 102-112) of a network. In such an example, the RF front end 304 may tune or listen on a center frequency over a bandwidth as great as a widest bandwidth used by any supported protocol.

In a second example of the RF front end 304, a plurality of frequencies may be used. In such an example, the RF front end 304 may be configured to perform a frequency hopping functionality. The frequency hopping functionality may be associated with a pattern of frequency hopping that may be used for some or all of the protocols. Thus, frequency hopping may be performed over a plurality of channels defined within a bandwidth. At each hop, the RF front end listens for the plurality of differently modulated signals. In one example, a same frequency hopping pattern is used for all of a plurality of protocols.

The baseband processor 306 may be configured to simultaneously listen for a plurality of differently modulated signals, to recognize a preamble of a packet, to determine a protocol associated with the recognized preamble, and to demodulate data in the packet according to the recognized preamble. In one example of the baseband processor 306, listening for the differently modulated signals may be performed in parallel, and may involve a plurality of preamble detection processes running in parallel, each preamble detection processes configured to recognize one of a plurality of different packet preambles. In contrast, demodulating data in accordance with the protocol may be performed by a packet demodulator associated with the protocol in a serial manner.

The baseband processor 306 may be configured to include a plurality of preamble detection processes, each of which may be associated with one of a plurality of packet demodulators. The plurality of preamble detection processes may be configured to operate in parallel. Each preamble detection process may recognize, detect and/or distinguish one or more of a plurality of synchronization headers (or just the preamble) from one or more received packets. By operating in a parallel or simultaneous manner, each of a plurality of preamble detection processes may listen for a preamble with which it is associated. Barring a collision among several preambles or signal attenuation, one of the preamble detection processes may detect a preamble. The detected preamble is used to determine an associated protocol.

The baseband processor 306 may be configured to determine a protocol based on the preamble or the preamble detection process that detected the preamble. For example, preambles may be linked to protocols, or preamble detection processes may point to an appropriate packet demodulator process. Having determined a protocol associated with a packet, the baseband processor 306 is configured demodulate data in the packet according to the protocol.

The baseband processor 306 may be configured to extract (demodulate) data from packet(s) associated with the synchronization header. The demodulation may be performed according to a protocol indicated by the determined synchronization header and/or preamble. This demodulation process may be performed in serial fashion, according to the determined protocol.

In operation, the multiple protocol receiver 300 receives an RF signal at the antenna 302. An RF front end 304 tunes the received signals, thereby providing digital output according to the RF input. The digital output arrives at the baseband processor 306 where a plurality of preamble detection processes are operating simultaneously in a parallel or multitasking mode. Each preamble detection process is configured to listen for a particularly modulated signal, and to thereby detect a particular preamble. When one of the plurality of preamble detection processes detects a known preamble, an associated protocol is identified. An appropriate packet demodulator from among a plurality of packet demodulators is selected, based on the identified protocol. The packet demodulator, operating in a serial mode, then demodulates data within the packet.

Figure 4:
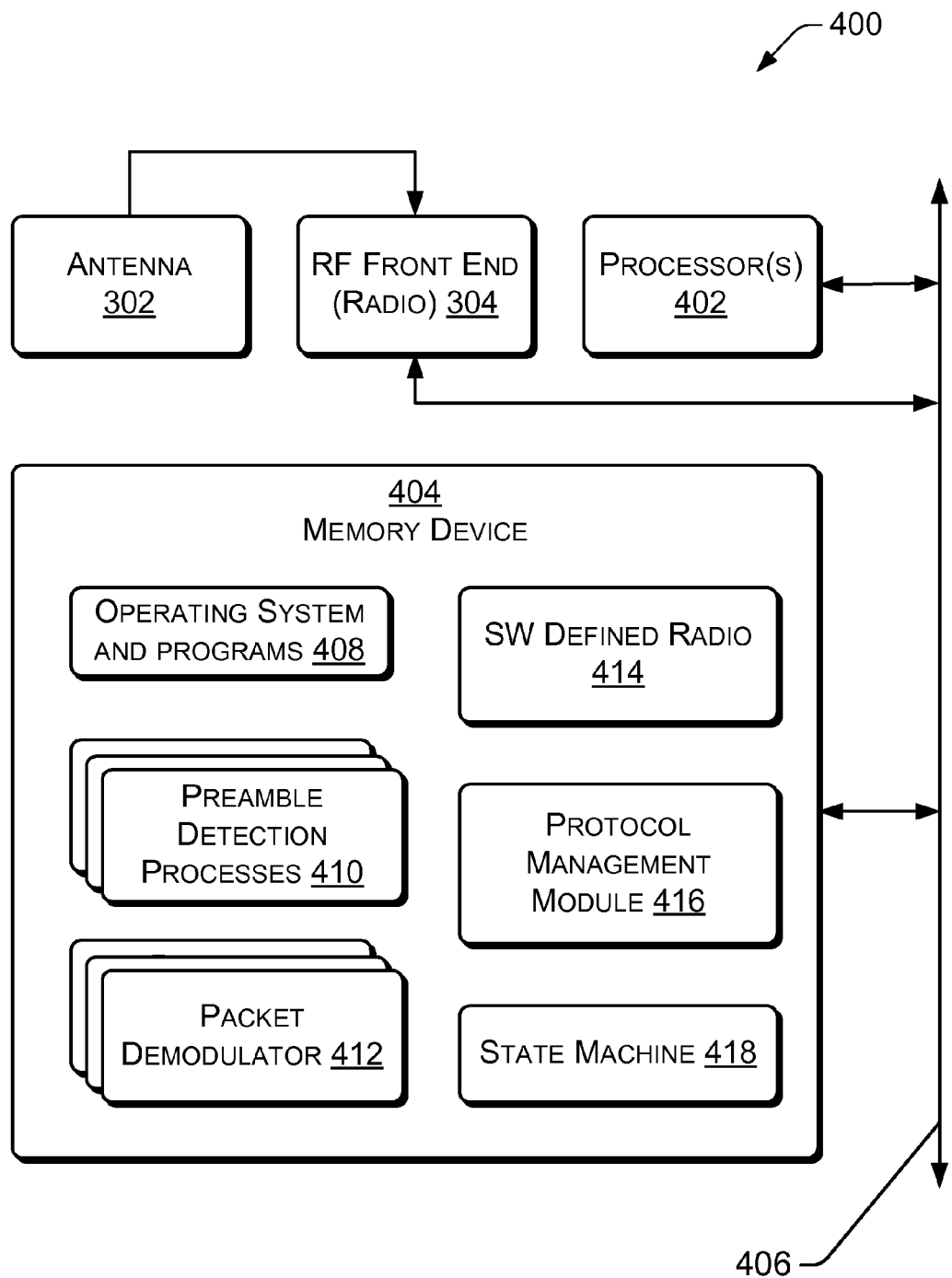
FIG. 4 is diagram showing a second example of a multiple protocol receiver.

FIG. 4 is diagram showing a second example of a multiple protocol receiver 400. The multiple protocol receiver 400 is configured to receive and tune RF signals, detect a synchronization header and/or preamble, find an associated modulation protocol, and demodulate data from a packet or stream of packets. The example multiple protocol receiver 400 is shown to include logic or programming blocks. Such blocks are intended as an example of software and/or hardware logic, for purposes of illustration and/or discussion, and are not intended to indicate a required organization of software statements or integrated circuit logic.

The multiple protocol receiver 400 may include an antenna 302 and RF front end 304, which may be configured similarly to those components in FIG. 3. Additionally, the multiple protocol receiver 400 may include a processor 402, a memory device 404 and a communications bus 406. The processor 402 may be a micro-processor, a parallel processor, specialized processor (e.g., a GPU), a processor-array or other type of processor. Alternatively, the processor 402 may be integrated with the memory 404 in a monolithic format. Further, the processor, memory, and/or RF front end 304 may be configured within an ASIC device, with or without other components of a device with which the multiple protocol receiver 400 may be associated.

The memory device 404 may include an operating system and one or more other programs 408. Additionally, the memory device may include one or more preamble detection processes 410, one or more packet demodulators 412, a software defined radio 414, a protocol management module 416 and a state machine 418. Such programs, processes, modules, etc., can include computer-readable and/or processor readable statements, which when executed by the processor 402, result in execution of one or more methods, including methods that receive and tune RF signals, detect and/or recognize a preamble and/or synchronization header, determine an associated modulation protocol, and demodulate data from a packet according to the protocol. The computer-readable statements may be defined in discrete memory and executed by a processor such as a microprocessor, or may be defined in logic and executed by a processor such as within an ASIC device or other component.

A plurality of preamble detection processes 410 may be configured for simultaneous, i.e., parallel, operation, such as in a multitasking environment. Each of the plurality of preamble detection processes 410 may be configured to detect and/or recognize a particular synchronization header and/or preamble of a particularly modulated signal and/or packet. Referring to the example of FIG. 2, each of the plurality of preamble detection processes 410 may be configured to detect or recognize the preamble 206 in the packet 200. Similarly, each of the plurality of preamble detection processes 410 may be configured to detect the synchronization header 202, such as by detection or recognition of the preamble 206 and/or the sync word 208.

Accordingly, each of the plurality of preamble detection processes 410 may be configured to recognize a particular preamble associated with a particular modulation. Thus, detection and/or recognition by one of the plurality of preamble detection processes 410 of a particular preamble results in a determination or recognition of a particular protocol that was used to modulate a packet associated with the detected preamble. This association, between a recognized preamble and a protocol used to modulate the packet of the recognized preamble, may be made in any of a number of manners. In one example, preambles may be linked to protocols in a data structure. In a second example, each preamble detection processes 410 may point to an appropriate packet demodulator 412 from among a plurality of packet demodulators, wherein each packet demodulator is associated with one of a plurality of protocols. Accordingly, detection of a preamble by one of the plurality of preamble detection processes results in knowledge of a protocol and of an appropriate packet demodulator 412 associated with the protocol for use in demodulating the packet.

A plurality of packet demodulators or packet demodulating processes 412 may be configured for serial operation. In one example, each of the plurality of packet demodulators 412 is associated with one of the plurality of preamble detection processes 410. In operation, successful detection of a preamble by a preamble detection process results in execution of a packet demodulator associated with that preamble detection process. Thus, once a protocol is recognized, a packet demodulator 412 associated with the protocol is selected and executed. Execution of the packet demodulator 412 demodulates the packet according to the protocol associated with the demodulator. Thus, the packet demodulator 412 demodulates data within the packet associated with the detected preamble using a bit rate, synchronization, error correcting redundancy, etc., associated with the protocol. Additionally, the packet demodulator 412 may be configured to configure and/or direct operation a software-defined radio 418.

Software-defined radio 414 may be in communication with the RF front end 304. The software-defined radio 414 may include components, otherwise implemented using analog components (e.g. mixers, filters, amplifiers, modulators and/or demodulators, detectors, etc.), implemented in software executed by a processor or application specific integrated circuit (ASIC) or other embedded computing device(s). The software-defined radio 414 may utilize processor 402 and software defined or stored in memory 404. Accordingly, a balance may be made between functionality performed by the RF front end 304 and functionality performed by the software defined radio 414. The software-defined radio 414 may be configured for operation by a packet demodulator 412, based on a protocol associated with the packet demodulator. Such configuration may involve settings for mixers, filters, amplifiers, modulators and/or demodulators, detectors, etc.

A protocol management module 416 may configured manage operation of the preamble detection processes 410, the packet demodulators 412, the software defined radio 414 and other structures, software objects and devices, as indicated by a particular application or design. In one example, the protocol management module 416 may utilize a state machine or other logical construct to assist in the management of preamble detection, protocol recognition, packet demodulator selection and packet demodulation. Alternatively, a different logical control may be utilized to obtain similar results.

The state machine 418 may be defined to assist in the management of the operation of the multiple protocol receiver 400. The state machine 418 is representative of any of a number of logical devices, constructs or techniques used to manage control and operation of a process, and to thereby call one or more processes or modules in a desired sequence and according to a desire timing. A second example state machine is discussed below, with respect to FIG. 6. As an initial example, state machine 418 may utilize two or more states and movement between the states. Example states include: (1) simultaneously listening for differently modulated signals RF signals indicating a packet, (2) detecting a preamble associated with the packet, (3) determining a protocol indicated by the preamble, and (4) demodulating the received packet according to the protocol. Each iteration of the above four states could be performed sequentially, and completion of the four states or failure at any state could result in return to the first state.

Example Processes

Figure 5:
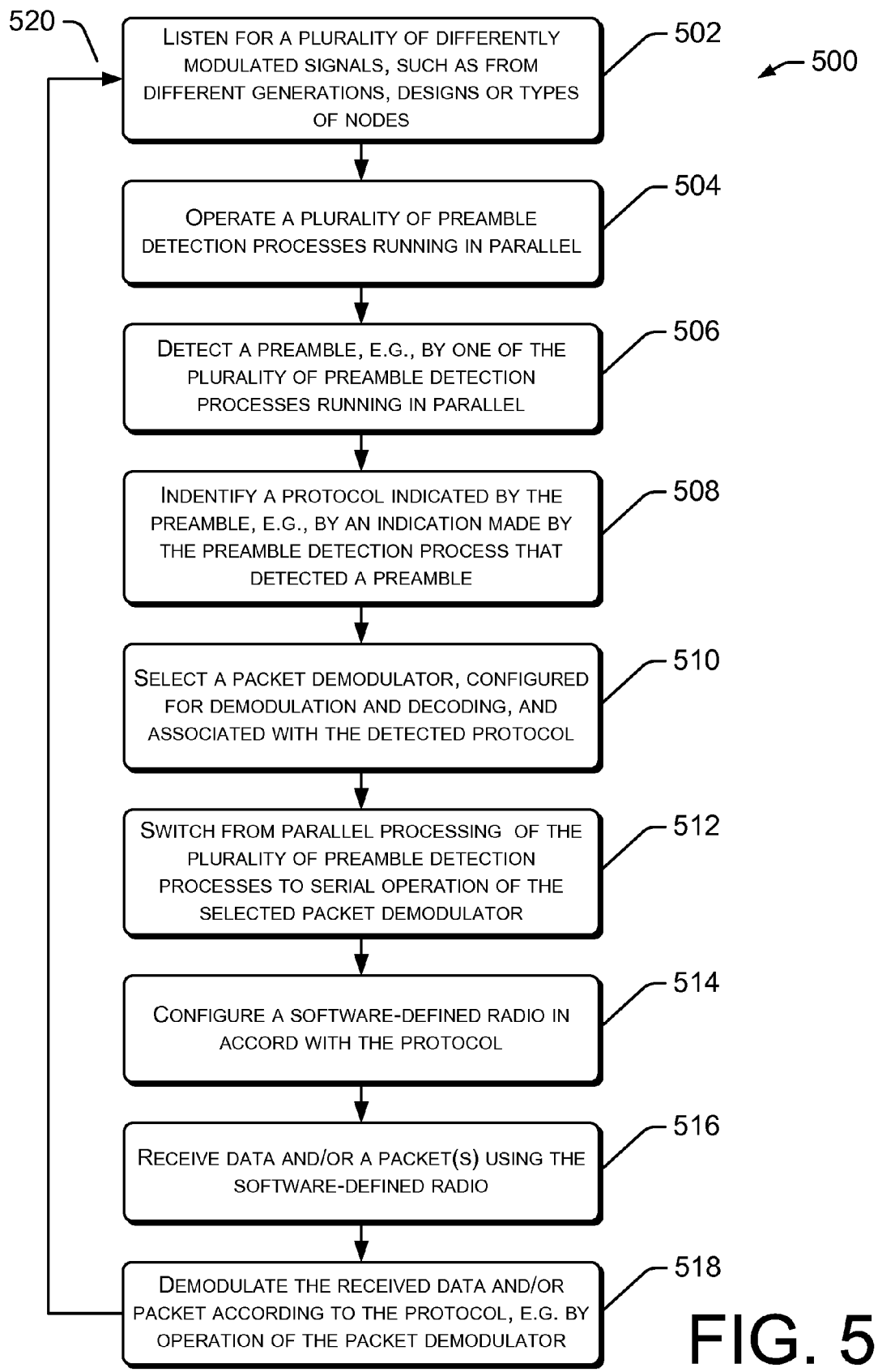
FIG. 5 is a flow diagram illustrating an example process associated with a multiple protocol receiver.
Figure 6:
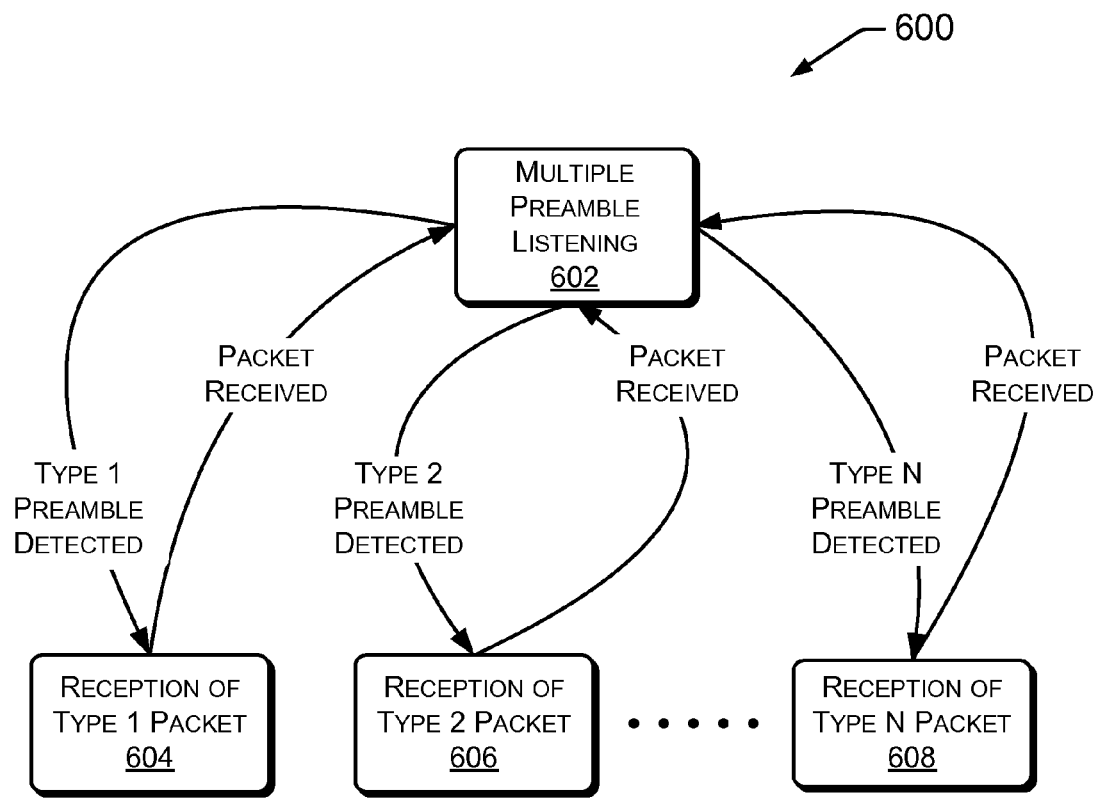
FIG. 6 is an example state machine that may be used in the design, implementation, programming and/or operation of a multiple protocol receiver.

FIGS. 5 and 6 illustrate example processes, which can be understood in part by reference to the configurations of FIGS. 1-4. However, FIGS. 5 and 6 contain general applicability, and are not limited by other drawing figures and/or prior discussion.

Each process described herein is illustrated as a collection of blocks or operations in a logical flow graph, which represent a sequence of operations that can be implemented in hardware (e.g., an integrated circuit of specialized or general design), software, or a combination thereof. The processes may include storing, in a memory communicatively coupled to a processor, computer-executable instructions for performing a method, such as a method of multiple protocol receiving, and executing the instructions on the processor.

In the context of software, the operations represent computer-executable instructions stored on one or more computer-readable storage media 404 that, when executed by one or more processors 402, perform the recited operations. Such storage media 404, processors 402 and computer-readable instructions can be located within a multiple protocol receiver (e.g., receivers or systems 300, 400 of FIGS. 3 and 4) according to a desired design or implementation. The storage media 404 seen in FIG. 4 is representative of storage media generally, both removable and non-removable, and of any technology. Thus, the recited operations represent actions, such as those described in FIGS. 5 and 6, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

Computer storage media and/or memory includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of the system or multiple protocol receiver. Moreover, the computer-readable media may include computer-executable instructions that, when executed by the processor(s) 402, perform various functions and/or operations described herein.

Additionally, for purposes herein, a computer readable media and one or more processors configured to execute statements or logic within the media may include all or part of an application specific integrated circuit (ASIC) or other hardware device. Such a hardware device may be configured to include other functionality, including functions performed in a metering device, a network node, endpoint or other device. Accordingly, within such an integrated circuit, one or more processors are configured with executable instructions, which may be defined by logic, transistors or other components, or on-board memory.

As defined herein, computer storage media does not include carrier waves, data signals, or other transitory media.

FIG. 5 is a flow diagram illustrating an example process 500 associated with operation of an example multiple protocol receiver. In one example, the process 500 may be performed by a node, a multiple protocol receiver, or any element in an RF or wireless network. The process may include a first state (e.g., as indicated by a state machine or other programming or hardware logic construct) including receiving and tuning RF signals and detecting a preamble in a packet. In one example, this state may be performed using parallel processing and a plurality of preamble detection processes (or a single process capable of detecting multiple preambles). A second state may include determining a protocol indicated by the preamble and demodulating data according to the protocol. In one example, this state may be performed using serial processing.

FIG. 5 shows that at operation 502, a plurality of differently modulated signals is listened for. In one example, the different modulation of the signals results from different generations, designs or types of nodes. For example, there may be technology differences between older and newer nodes, which may result in the use of different modulation. Different node types or designs may also result in different modulation of their transmissions. Due in part to its location, any particular node may receive a plurality of differently modulated signals.

At operation 504, a plurality of preamble detection processes running in parallel may be operated. Each of the plurality listens for a particular preamble portion of a packet. Referring to the example of FIG. 4, the plurality of preamble detection processes 410 may be operated in a multitasking (e.g., a time-sharing) environment. In a hardware device, the operation may actually be concurrent. Each of the plurality of preamble detection processes 410 may be configured to listen for one particular type of packet preamble, which is associated with a particular protocol by which the packet is modulated. In one example, the plurality of preamble detection processes 410 may include only those processes associated with protocols used by nearby nodes. In an alternative example, the plurality of preamble detection processes 410 may include a broader set of processes. This may be advantageous in that changes to the network will not result unrecognized preambles and customization of multiple protocol receivers may be avoided.

At operation 506, a preamble is detected. Referring again to the example of FIG. 4, one of the plurality of preamble detection processes 410 may be successful in detecting a preamble. Success indicates that a node in the vicinity of the multiple protocol receiver operating according to the process 500 has broadcast a packet having a preamble that is detected by one of the plurality of preamble detection processes 410.

At operation 508, a protocol indicated by the preamble is identified and/or determined. Referring to the example of FIG. 4, the preamble detection process 410 that detected the preamble may make an indication or identification of the protocol associated with that preamble. In particular, each preamble detection process 410 may be associated with a protocol and/or a packet demodulator that is associated with the protocol. Thus, upon successful detection of a preamble, the successful preamble detection process 410 may point to, or otherwise indicate, a protocol and/or a packet demodulator 412 associated with the protocol.

At operation 510, a packet demodulator is selected to correspond to the detected or discovered protocol. The selected packet demodulator will be configured for demodulation and decoding of the packet having the detected preamble according to the indicated protocol. Referring to the example of FIG. 4, a plurality of packet demodulators 410 may be available. In a particular example, one packet demodulator may be available for each protocol. Thus, the selection of a packet demodulator is determined by the protocol indicated by the preamble that was detected.

At operation 512, the multiple protocol receiver switches from parallel processing of the plurality of preamble detection processes to serial operation of the packet demodulator selected from among a plurality of packet demodulators based on the protocol indicated by the preamble.

At operation 514, a software radio may be configured according to, or in a manner consistent with, the protocol. In one example, mixers, filters, amplifiers, modulators and/or demodulators, detectors, etc. of the software radio may be configured according to the requirements of the protocol. In the example of FIG. 4, the selected packet demodulator 412 may configure the software radio 414 according to the protocol associated with the demodulator.

At operation 516, data and/or packet(s) are received using the software radio. In an alternative embodiment, incoming signals may be processed by any type of radio, processor-executable software and/or integrated circuit device. In either case, modulated data is produced from incoming RF signals.

At operation 518, the modulated data is demodulated according to the protocol associated with the packet demodulator in use. For example, the packet demodulator selected at operation 510 is operated, thereby demodulating the data in the packet whose preamble was recognized. The demodulation addresses issues such as bit rate, synchronization and error-correcting redundancy, etc.

At operation 520, the process 502-518 may be repeated. In one example, the process is repeated for each packet received by the multiple protocol receiver.

FIG. 6 shows detail of the example state machine 600. The state machine 600 may be used in the design, implementation, programming and/or operation of a multiple protocol receiver. At state 602, an example multiple protocol receiver performs multiple preamble listening. In one example, a plurality of preamble detectors operating in a parallel manner attempt to detect and/or recognize a known preamble. In the example of FIG. 4, the plurality of preamble detection processes 410 listens to a plurality of differently modulated signals, each preamble detection process attempting to recognize and/or detect a preamble with which it is associated. When a preamble is detected, the state changes to demodulation of data according to a protocol associated with the recognized preamble. Such demodulation is seen in states 604-608. For example, if a "type 1" preamble is detected, the state changes to state 604, where "type 1" packets are listened for and/or received.

At state 604, packet(s) of "Type 1" are received. "Type 1" packets may be associated with a protocol indicated by the preamble detected at state 602. A packet demodulator, which is associated with the protocol, is selected. Referring again to the example of FIG. 4, a packet demodulator 412 is selected. Operation of the packet demodulator demodulates the packet, thereby obtaining the data from the packet. Upon completion of the demodulation of a packet at state 604, control of the state machine returns to block 602.

States 606 and 608 are configured similarly to state 604, but according to packets of a different "type" or protocol. Accordingly, packets are demodulated using a different packet demodulator. Accordingly, states 604-608 are representative of reception of an arbitrary number of packets types or protocols, and would be demodulated with packet demodulators configured for operation according to the indicated protocol.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A method, comprising:
    under control of one or more processors configured with executable instructions:
    listening for a plurality of differently modulated signals;
    detecting a preamble associated with one of the plurality of differently modulated signals, wherein the detecting is performed in a first state in a state machine and the detecting comprises parallel processing of a plurality of preamble detection processes;
    identifying a protocol indicated by the preamble; and
    demodulating a received packet according to the protocol, wherein the demodulating is performed in a second state in the state machine and the demodulating comprises serial processing by a packet demodulator.

2. The method as recited in claim 1, wherein:
    demodulating the received packet comprises configuring settings of a software-defined radio consistently with the protocol.

3. The method as recited in claim 1, wherein listening for the plurality of differently modulated signals comprises:
    listening on a same channel center frequency for all of the differently modulated signals; and
    listening over a bandwidth as wide as a widest bandwidth used by any of the differently modulated signals.

4. The method as recited in claim 1, wherein listening for the plurality of differently modulated signals comprises:
    frequency hopping over a plurality of channels defined within a bandwidth and listening for the plurality of differently modulated signals at each hop; and
    using a same frequency hopping pattern for all of a plurality of protocols.

5. A method, comprising:
    under control of one or more processors configured with executable instructions:
    receiving a preamble defined by a radio frequency (RF) signal, the receiving performed by a plurality of preamble detection processes operating in parallel;
    detecting the preamble with one of the plurality of preamble detection processes;
    associating the detected preamble with a protocol;
    advancing from a first state in a state machine, associated with parallel processing of the plurality of preamble detection processes, to a second state in the state machine, associated with serial processing, in response to associating the detected preamble with the protocol;
    configuring a software-defined radio in accordance with the protocol for the serial processing;
    receiving a packet using the software-defined radio; and
    demodulating the received packet according to the protocol.

6. The method of claim 5, wherein the plurality of preamble detection processes is associated with a plurality of protocols, respectively.

7. The method of claim 5, wherein configuring the software-defined radio comprises:
    configuring filters and demodulators of the software-defined radio using the protocol.

8. The method of claim 5, wherein configuring the software-defined radio comprises:
    configuring settings of the software-defined radio, the settings configuring mixers, filters and amplifiers, as indicated for processing of modulated data according to the protocol.

9. The method of claim 5, wherein:
    receiving the preamble is performed in a parallel processing mode by a hardware device; and
    demodulating the received packet is performed in a serial processing mode by the software defined radio.

10. The method of claim 5, wherein the plurality of preamble detection processes are associated with preambles previously heard or expected to be heard.

11. A multiple protocol receiver, comprising:
    a processor;
    a memory in communication with the processor;
    an antenna to receive signals;
    a radio frequency (RF) front end, in communication with the antenna;
    a plurality of different preamble detection processes, configured to operate on the processor and receive information from the RF front end, each of the plurality of preamble detection processes associated with one of a plurality of different preambles and one of a plurality of different protocols; and
    a plurality of different packet demodulators, wherein each packet demodulator of the plurality of different packet demodulators is associated with the plurality of different protocols preamble detection processes, and wherein successful detection of a preamble by a respective preamble detection process of the plurality of different preamble detection processes results in execution of an associated packet demodulator.

12. The multiple protocol receiver of claim 11, wherein the plurality of different preamble detection processes is configured for parallel processing on the processor.

13. The multiple protocol receiver of claim 11, wherein the multiple protocol receiver is configured for:
    switching from parallel processing of the plurality of different preamble detection processes to serial demodulation of a packet with the associated packet demodulator, wherein:
        the switching is performed in response to detection of the preamble; and
        preamble detection is performed in a parallel processing mode, and data demodulation is performed in a serial mode according to the protocol, and both are performed on a same packet.

14. The multiple protocol receiver of claim 11, wherein the plurality of different preamble detection processes is configured to:
    listen for preambles from multiple generations of nodes, the multiple generations of nodes having multiple different modulation types.

15. The multiple protocol receiver of claim 11, additionally comprising a state machine defined in the memory as computer executable instructions, which when executed is configured to perform a method comprising:
- executing the plurality of different preamble detection processes in a parallel processing mode;
- switching from the parallel processing mode to a serial processing mode in response to detection of the preamble; and
- demodulating the packet in the serial processing mode.

16. The multiple protocol receiver of claim 11, additionally comprising:
- a software-defined radio, having filters and demodulators configured in accord with the protocol.

17. A multiple protocol receiver, comprising:
- an antenna;
- a radio, in communication with the antenna, to listen for a plurality of differently modulated signals; and
- one or more hardware integrated circuits for:
  - detecting a preamble associated with one of the plurality of differently modulated signals received by the radio by parallel operation of a plurality of preamble detection processes, each configured to listen for one of the plurality of differently modulated signals, respectively;
  - identifying a protocol indicated by the preamble; and
  - demodulating a packet according to the protocol.

18. The multiple protocol receiver of claim 17, wherein:
- the detecting of the preamble is performed by parallel processing in a first state in a state machine; and
- the demodulating of the packet is performed by serial processing in a second state in the state machine.

19. The multiple protocol receiver of claim 17, wherein the radio is configured for:
- listening on a same channel center frequency for all of the differently modulated signals; and
- listening over a bandwidth as wide as a widest bandwidth used by any of the differently modulated signals.

20. The multiple protocol receiver of claim 17, wherein the radio is configured for:
- frequency hopping over a plurality of channels defined within a bandwidth and listening for the plurality of differently modulated signals at each hop; and
- using a same frequency hopping pattern for all of a plurality of protocols.

21. The multiple protocol receiver of claim 17, wherein the one or more hardware integrated circuits are configured for:
- advancing from a first state in a state machine to a second state in the state machine in response to detecting the preamble and identifying the protocol;
- wherein the first state comprises parallel processing and the second state comprises serial processing.

* * * * *